United States Patent [19]
Cahoe et al.

[11] 3,990,318
[45] Nov. 9, 1976

[54] ACCUMULATING CONTROL CLUTCH MECHANISM

[75] Inventors: James R. Cahoe; Joseph M. Miller, both of Louisville, Ky.

[73] Assignee: General Electric Company, Louisville, Ky.

[22] Filed: Mar. 20, 1975

[21] Appl. No.: 560,536

[52] U.S. Cl. .................... 74/128; 194/92
[51] Int. Cl.[2] .................... F16H 27/02
[58] Field of Search .................... 74/112, 575, 577, 45, 74/128; 194/92

[56] References Cited

UNITED STATES PATENTS

| | | | |
|---|---|---|---|
| 3,456,516 | 7/1969 | Fisnar et al. | 74/575 |
| 3,576,137 | 4/1971 | Zinninger | 194/92 |
| 3,605,509 | 9/1971 | Harris, Sr. | 194/92 |
| 3,717,043 | 2/1973 | Cartier | 74/112 |

*Primary Examiner*—Samuel Scott
*Assistant Examiner*—Wesley S. Ratliff, Jr.
*Attorney, Agent, or Firm*—Frederick P. Weidner; Francis H. Boos

[57] ABSTRACT

An accumulating control clutch mechanism responsive to reciprocation of the coin slide of a coin receiving mechanism. The control clutch is arranged such that the shaft of a timer mechanism associated therewith is rotated unidirectionally to start the timer in response to a predetermined desired number of reciprocation movements of the coin slide. By this accumulating control clutch mechanism there is provided a means for changing a single slide reciprocation operation to start the timer mechanism to a multiple slide reciprocation operation without changing the coin receiving mechanism.

7 Claims, 10 Drawing Figures

ACCUMULATING CONTROL CLUTCH MECHANISM

BACKGROUND OF THE INVENTION

1. Field of the Invention

This invention relates generally to coin-operated timer mechanisms such as may be used to control laundry machines, and more specifically, to a control clutch for the coin-operated timer mechanism particularly adapted for use on automatic laundry machines.

2. Description of the Prior Art

In U.S. Pat. Nos. 3,576,137 to Zinninger and 3,605,509 to Harris, both assigned to the same assignee of the instant invention, means are described for accumulating timer run time by the sequential introduction of a series of coins in a coin-receiving mechanism such as on automatic clothes dryers. The coin-receiving mechanism employed by Zinninger and Harris are of a type commonly available, the structure and operation of which is well known to those skilled in the art. Such coin-receiving mechanisms commonly incorporate a reciprocating slide movable inwardly and outwardly and biased toward the outward position. These mechanisms have various assemblies adapted to receive, evaluate and collect coins and to restrict the reciprocation of the slide in the event of inadequate or improper coinage deposit.

Such coin-receiving mechanisms generally have a fixed coin denomination with either single or multiple coin slots. Usually a single reciprocation actuates the timer mechanism that controls the machine operation. There are some of these mechanisms that are capable of accumulating coins until the proper amount is collected then the timer mechanism is actuated. There is, however, no way of converting from a single slide reciprocation operation to a multiple slide reciprocation operation without changing the coin-receiving mechanism, which is an expensive device. This is particularly true in regard to coin-operated automatic washers wherein a single reciprocation starts the machine and then the machine automatically proceeds through the various wash cycles, until the washing operation is completed at which time the machine turns off.

By this invention there is provided a means for changing a single slide reciprocation operation to a multiple slide reciprocation for actuation of the timer mechanisms without changing the coin-receiving mechanism and it is much less expensive and easy to install in the coin-operated machine.

SUMMARY OF THE INVENTION

There is provided an accumulating control clutch mechanism responsive to reciprocation movement of the coin slide of a coin-receiving mechanism wherein the control clutch rotates the shaft of a timer mechanism unidirectionally in response to one or more than one, as desired, reciprocation movements of the coin slide. The control clutch mechanism includes a setting hub having at least one tooth thereon and which is keyed to the timer shaft for rotational movement therewith. There is a ratchet wheel with teeth which is rotatable relative to the setting hub, the wheel having at least one cutout portion therethrough. There is also an actuator arm that carries a ratchet pawl adapted to engage the ratchet wheel teeth and turn the wheel with each reciprocation movement of the actuator arm and at a preselected reciprocation movement pass through the cutout portion and engage a tooth of the setting hub to rotate the hub and thereby rotate the setting shaft to start the timer mechanism. Reciprocation movement of the actuator arm is responsive to reciprocation movement of the coin slide by a unidirectional coupling means associated with the slide and cooperating with the actuator arm.

DESCRIPTION OF THE PREFERRED EMBODIMENT

Figure 1:
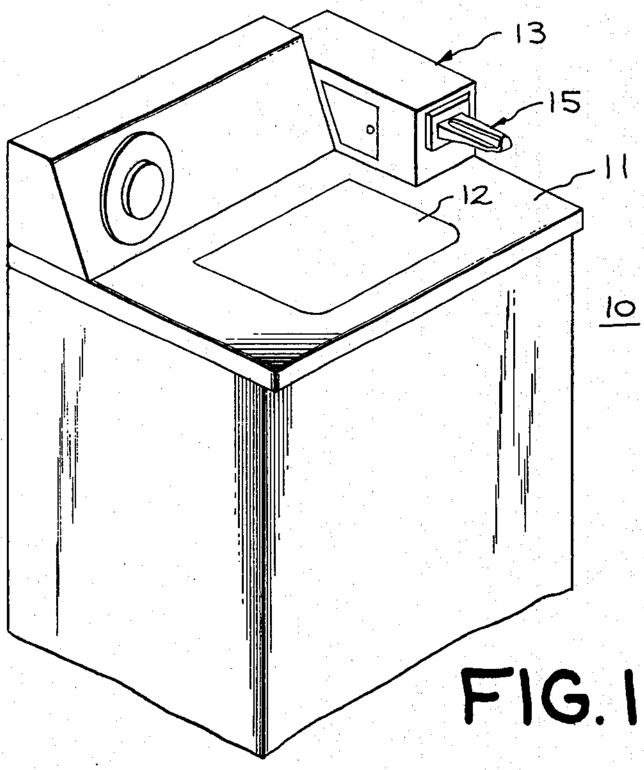
FIG. 1 is a perspective view of a clothes washer incorporating the accumulating control clutch mechanism of this invention.

Referring now to the drawings, and initially to FIG. 1 thereof, there is illustrated a laundry machine, such as an automatic clothes washer 10 having a suitable appearance and protective outer cabinet 11 with a service access door 12 pivotally mounted thereon for providing entry to the interior of the cabinet 11. The cabinet 11 also supports a coin-operated mechanism 13 adapted to initiate and control the operation of the washer 10 in response to the introduction of appropriate coinage through a coin-receiving mechanism 15.

Figure 2:
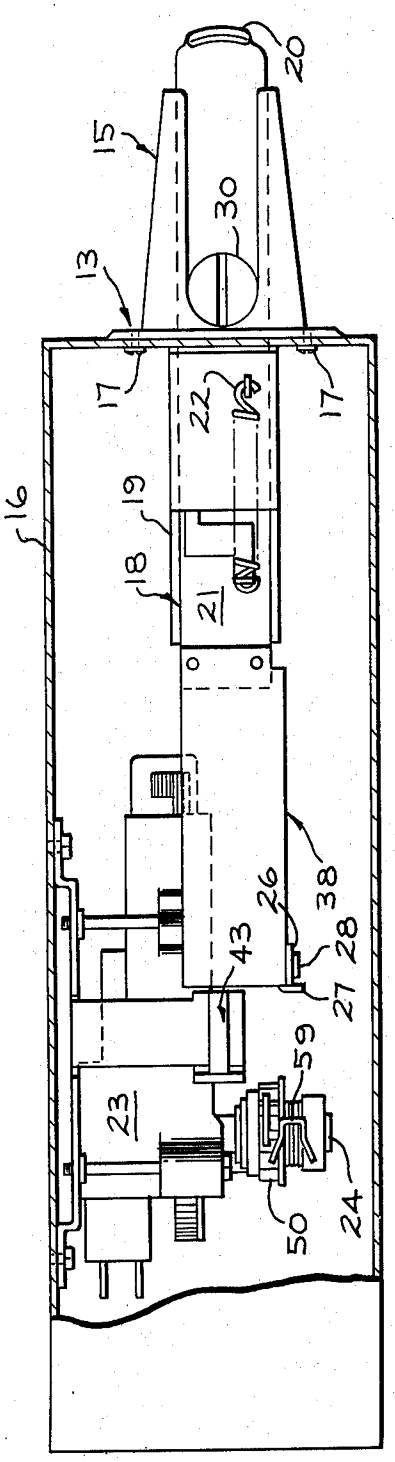
FIG. 2 is a top plan view illustrating various details of a coin-operated mechanism incorporating the accumulating control clutch mechanism of this invention.
Figure 3:
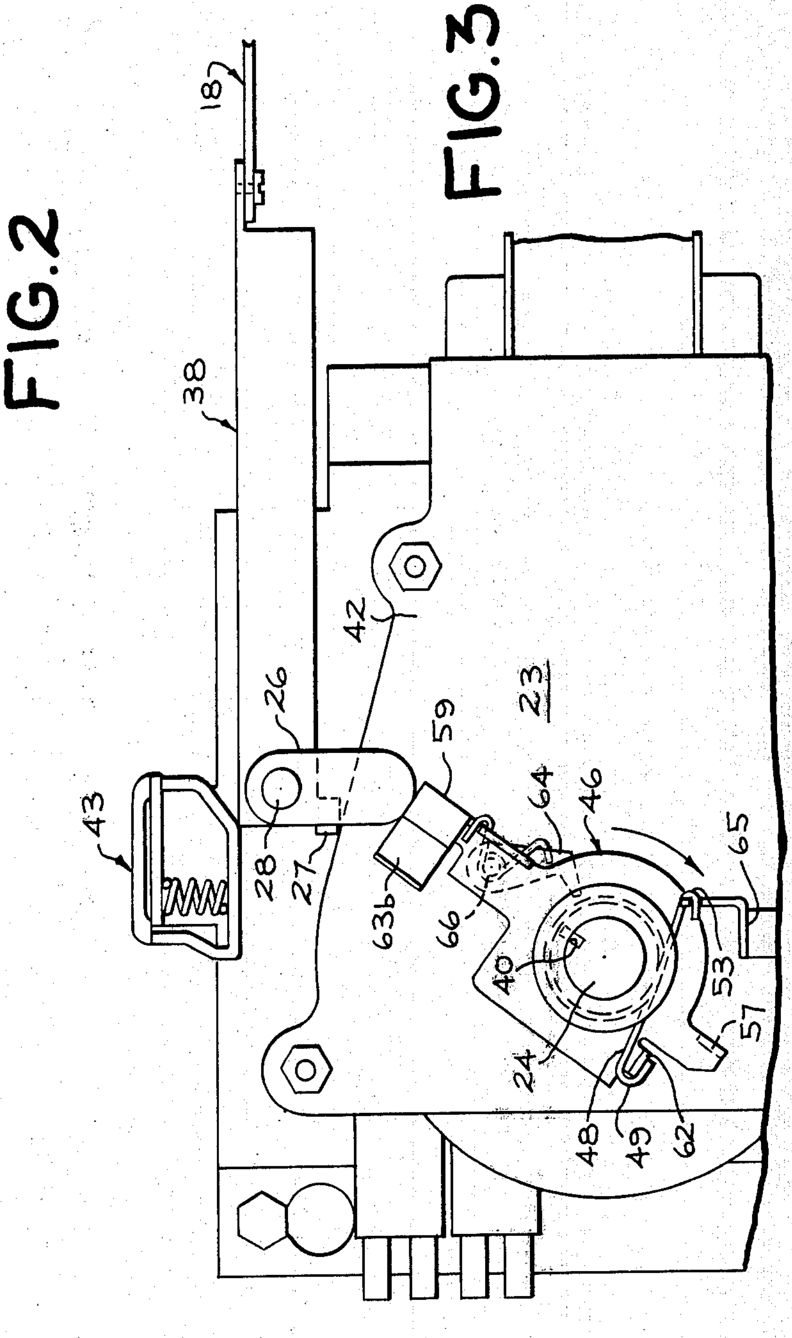
FIG. 3 is an enlarged side elevational view showing a portion of the coin-operated mechanism of FIG. 2.

In FIGS. 2 and 3 it may be seen that the coin-operated mechanism 13 comprises a rigid housing 16 having coin-receiving mechanism 15 secured to an end wall thereof by means of suitable fasteners 17. The details of coin-receiving mechanism 15 do not form a part of the instant invention and are well known in the art. In brief, such mechanisms comprise a slide 18 reciprocally mounted in a slide housing 19, the slide 18 having an outer end 20 accessible outside the housing and adapted to be moved manually by an operator and an inner end 21 adapted for mounting appropriate operational mechanisms thereon. A single coin slot 30 is shown in slide 18 although there may be more than one coin slot. A spring 22 operates between slide 18 and slide housing 19 to bias slide 18 outwardly. Included in the coin-receiving mechanism 15 are various assemblies (not shown) adapted to receive, evaluate and collect coins, and to restrict the reciprocation of slide 18 in the event of inadequate or improper coinage deposit.

A timer mechanism 23 is supported by the rigid housing 16 and has a setting shaft 24 extending outwardly therefrom. Included within timer mechanism 23 are a series of cam operated switches provided to control the program of washer 10. The timer mechanism 23 is so internally wired that when setting shaft 24 reaches a particular angular position, power to the motor of the timer mechanism is interrupted. To restart the timer mechanism, it is necessary to advance the timer setting shaft 24 in the direction of arrow 25.

A member 38 including unidirectional coupling means which may be in the form of a pivotal element 26 is secured to slide 18 by a pivot pin 28 and reciprocates therewith. On the inward movement of the slide, the pivotal element 26 is free to pivot counter clockwise, as viewed in FIG. 3, about pivot pin 28, however, on the outward movement it is prevented from rotating clockwise beyond its vertical position because of a projecting stop element 27 against which the pivotal element will abut. It will be noted that the pivot pin 28 is offcenter of the pivotal element whereby the pivotal element will tend to swing downwardly. This structural arrangement then acts as a unidirectional coupling means and its function will be described later.

Figure 4:
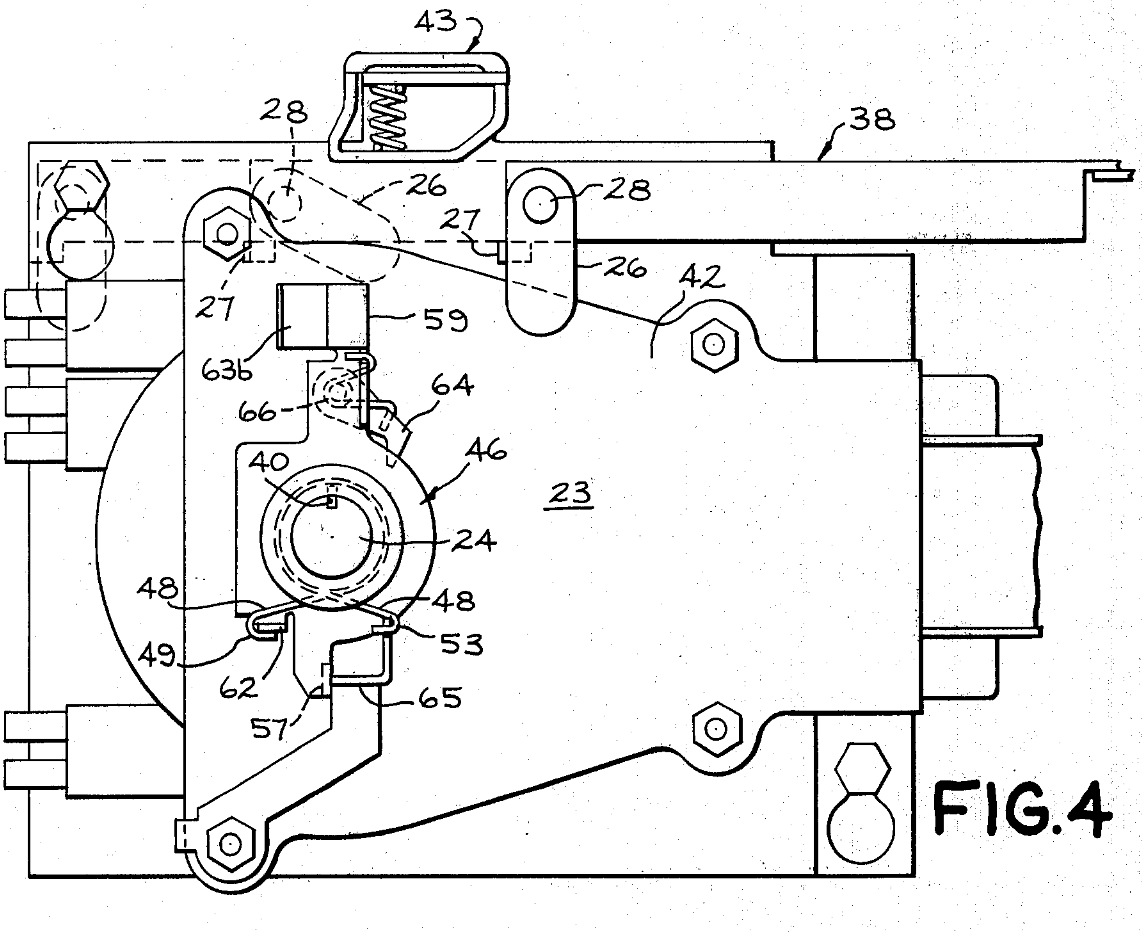
FIG. 4 is a partially enlarged view similar to FIG. 2 including the timer and showing the slide of the coin receiving mechanism in two different positions.
Figure 5:
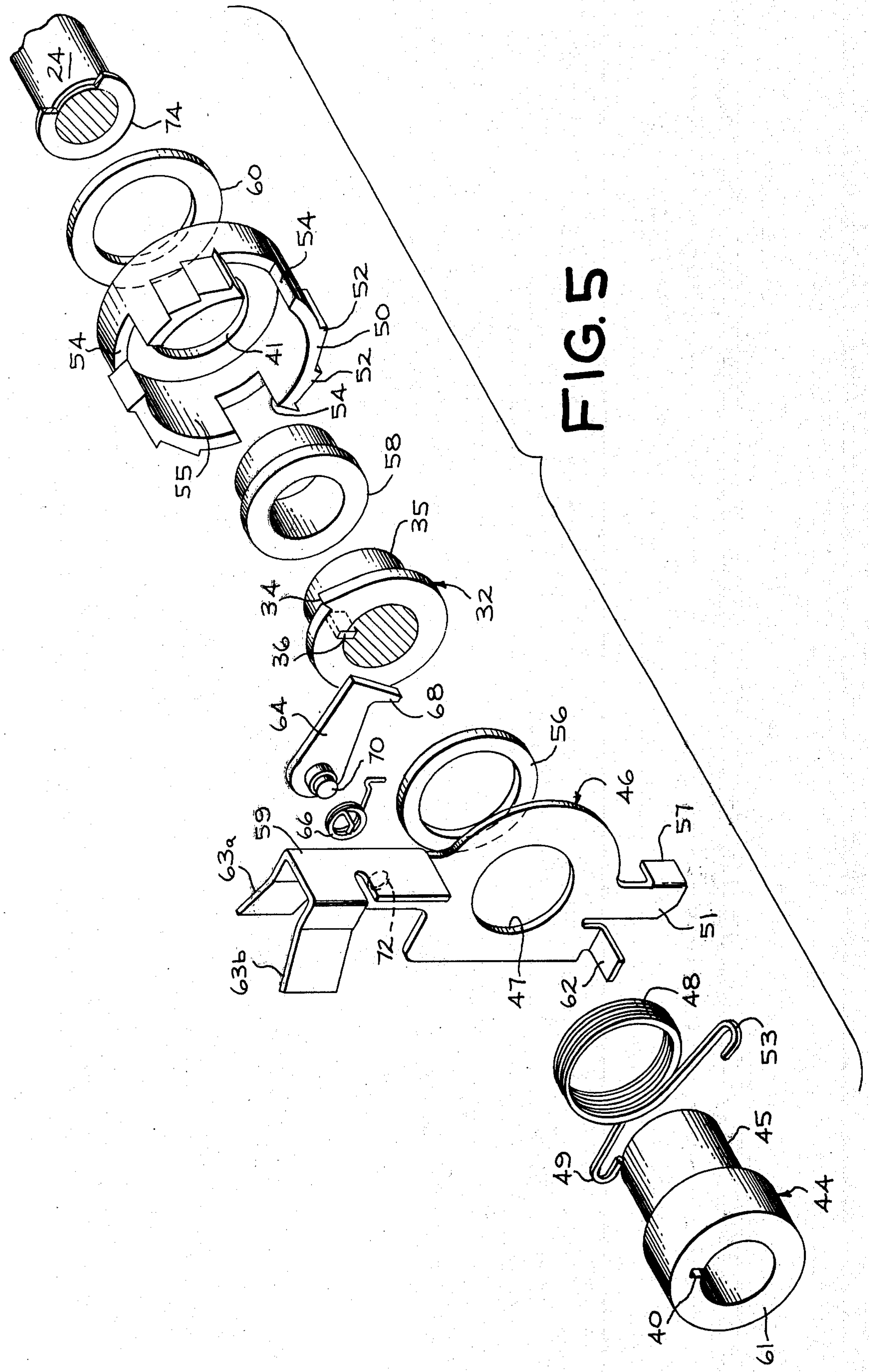
FIG. 5 is an exploded component view showing a portion of the accumulating control clutch mechanism.

With reference particularly to FIG. 5 the other components of the accumulating control clutch mechanism are shown in an exploded view. There is provided a setting hub 32 which has a hub tooth 34 in its body and has a reduced diameter collar 35. The hub tooth may project from the setting hub 32 body as shown in FIG. 5 or be recessed therein. A key element 36 is secured thereto and functions to key the setting hub 32 to the timer shaft 24 at the angular position shown in FIG. 6 by means of a recess 40 therein so that they rotate with each other in unison. There is provided a sleeve element 44 having a reduced diameter sleeve portion 45 which extends through an actuator arm 46 that has a circular hole 47 for receiving the reduced sleeve portion 45. The actuator arm 46 also has a projection or element 62 for securing end 49 of the coil spring 48. The other end 53 of the coil spring 48 is secured to rigid stop member 65. The tang 51 has an inwardly turned stop element 57. The actuator arm 46 is arranged for oscillatory reciprocation movement about the sleeve element 44. The coil spring 48 also carried on the reduced sleeve portion 45 is arranged to bias the actuator arm counter clockwise, as viewed in FIG. 4. There is a cup shaped ratchet wheel 50 that has a circular hub portion 41 through which the collar 35 of setting hub 32 projects. The ratchet wheel has a plurality of ratchet teeth 52 spaced around the outside periphery thereof and has at least one cutout section 54 through the side wall 55. The ratchet teeth may project from the ratchet wheel as shown in FIG. 5 or be recessed therein. In the preferred embodiment shown in the drawings there are three equally spaced cutout sections with three ratchet teeth between one cutout section and the next. Spacer elements which act as washer 56, 58 and 60 are utilized to enhance the operation of the accumulating control clutch mechanism.

With reference to the actuator arm 46 it has a portion 59 for contacting and cooperating with the movement of the unidirectional pivotal element 26 as will be explained later. The actuator arm portion 59 carries a ratchet pawl 64 which is spring biased in the direction of the ratchet wheel 32 by a spring 66. The ratchet pawl 64 has a ratchet tooth engaging projection 68 at the end thereof and at the other end is a pivot pin 70 that is received in a hole 72 in the actuator arm portion 59 and appropriately secured for pivotal movement about that pin.

When all of the component elements of FIG. 5 have been assembled they are held in their proper position relative to each other and in alignment on the timer shaft 24 which passes through all the components by a retaining ring 74. The retaining ring 74 is secured to the timer shaft 24 and abuts the front face 61 of sleeve element 44.

The operation of the accumulating control clutch mechanism is as follows. In previous automatic coin-operated washers having a coin slide, once the coinage is introduced into the coin slot or slots the slide 18 is pushed inwardly, stops and then is moved outwardly usually assisted by a spring. During either the inward or outward movement a unidirectional clutch keyed to the timer shaft is caused to rotate thereby setting the timer to run. However, if it was desired that more coinage be needed than that accomplished by one reciprocation of the slide, often the entire coin-receiving mechanism would have to be changed. This is a very expensive mechanism to replace. By this accumulating control clutch mechanism the same coin-receiving mechanism may still be utilized and each reciprocal movement of the coin slide can turn the ratchet wheel 50 by a predetermined desired increment without setting the timer to run, if so desired. This increment is equivalent to the spacing of the ratchet teeth 52 around the outside of the ratchet wheel and the number of reciprocal coin slide movements desired determines the number of teeth between one cutout section and the next.

Figure 6:
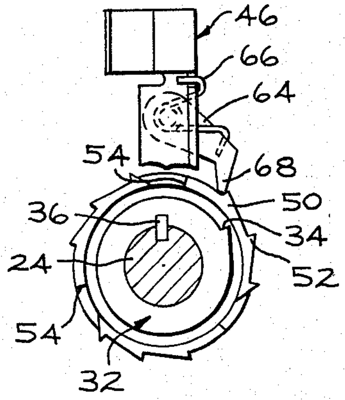
FIG. 6 is a side elevational view of a portion of the accumulating control clutch mechanism of this invention showing the mechanism ready for accumulating movement.
Figure 7:
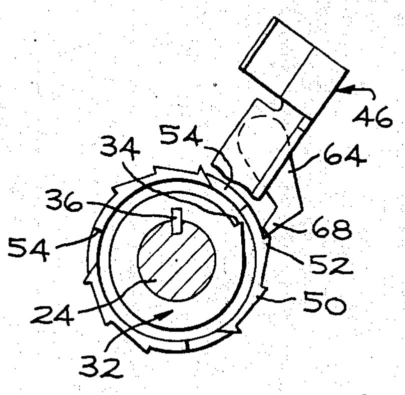
FIG. 7 is a side elevational view of a portion of the accumulating control clutch mechanism of this invention showing the mechanism after accumulating movement.

FIG. 4 shows the coin slide in its outward position in full line and the accumulating control clutch mechanism in a condition of preactuation. It will be noted that the actuator arm 46 is in a vertical position and not in contact with the unidirectional pivotal element 26. When the machine operator moves the coin slide 18 inwardly with the proper coinage in the coin slot the pivotal element 26 comes into contact with portion 59 of the vertically oriented actuator arm 46 and because the pivotal element is free to pivot in a counter clockwise motion it rides up and over the actuator arm (shown in dotted line) while the slide carrying the pivotal element 27 is continued to be moved inwardly. Once the pivotal element 27 has passed beyond the vertical actuator arm 46 it is free to rotate to a downward position because of the offcenter pivot pin. Upon withdrawal movement of the coin slide the pivotal element 26 comes into contact with the vertical actuator arm 46 between ears 63A and 63B of portion 59 but because of the stop element 27 rigidly secured to the slide it prevents the pivotal element from rotating in a clockwise movement. The position of the actuator arm 46 and the ratchet pawl 64 relative to the ratchet wheel 50 at the time the pivotal element 26 abuts the actuator arm 46 during withdrawal of the slide is shown in FIG. 6. When the actuator arm 46 has been moved to the position shown in FIG. 3 by continued withdrawal of slide 18 then the position of these three above-mentioned components are shown in FIG. 7.

During actuation of the actuator arm 46 by the abutting pivotal element 26 that element and the slide member 38 are prevented from riding over the top of the actuator arm 46 by a spring biased pressure pad 43 located above slide member 38. Other structural means may be provided to accomplish the same result. It will be appreciated that by this inward and outward movement, that is, one reciprocation movement of the slide, that there has been no setting or rotational movement of the timer shaft 24 but only oscillatory reciprocation movement of the actuator arm 46 and rotational movement of the ratchet wheel 50 by one increment, which is the distance from one ratchet tooth to the next.

Figure 8:
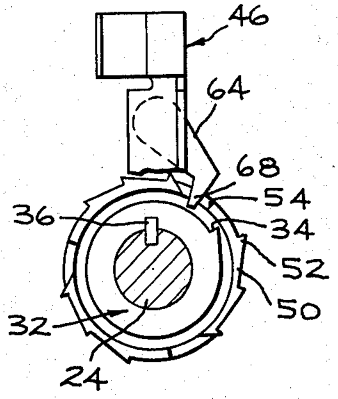
FIG. 8 is a side elevational view of a portion of the accumulating control mechanism of this invention showing the mechanism ready for timer start movement.
Figure 9:
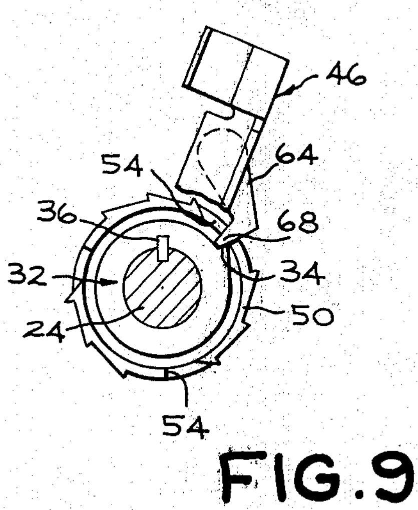
FIG. 9 is a side elevational view of a portion of the accumulating control clutch mechanism of this invention showing the mechanism partially through the timer start movement.
Figure 10:
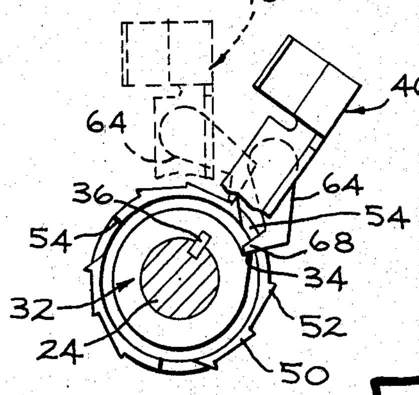
FIG. 10 is a side elevational view of a portion of the accumulating control clutch mechanism showing the timer start position in full line and in dotted line the accumulating position.

When the number of coin slide reciprocation movements equals the number of ratchet teeth then the cutout section 54 of the ratchet wheel 50 comes into play. When the slide 18 is in its outward position the spring element 48 causes the actuator arm 46 to be biased counter clockwise and be stopped at a vertical position as shown in FIG. 8. The stop is achieved by actuator arm stop 62 abutting a rigid stop member 65. When this happens the ratchet pawl 46 drops through the ratchet wheel cutout section 54 and contacts the setting hub 32. The components as shown in FIG. 8 retain that position during the next movement of the coin slide inwardly whereupon again the unidirectional pivotal element 26 rides up over the actuator arm 46 and then swings down upon clearance thereof. During the subsequent outward movement of the slide the pivotal element 26 again abuts the actuator arm and the pivotal element is prevented by stop 27 from pivoting clockwise so that upon continual withdrawal of the slide the actuator arm is moved clockwise thus carrying ratchet pawl 64 which moves the ratchet wheel 50 until the projection 68 of the pawl 64 contacts hub tooth 34 as seen in FIG. 9. Continued withdrawal of slide 18 causes setting hub 32 to be moved clockwise and the timer mechanism started to run near the completion of the withdrawal movement. This position is shown in full line in FIG. 10.

It will be noted that when the timer mechanism is started the timer shaft will proceed to move in a clockwise motion. With the oscillating actuator arm 46 being spring biased in a counter clockwise direction, it will be moved in that direction and the spring biased pivotal ratchet pawl 64 will pivot about its pivot pin 70 thereupon being removed from contact with the hub tooth 34 and also from the cutout section 54 and then come to rest on top of the ratchet wheel 50 when the actuator arm 46 is in its vertical position as shown in dotted line in FIG. 10.

The machine will then operate for a given amount of time through the cycles of the machine and come to a stop. At the end of the timer run the setting hub 32 will have been rotated by the timer shaft 24 to the position shown in FIGS. 6–19. At that time if the operation of the machine is to be started again the reciprocation of the slide mechanism depending upon the amount of coin operations designed into the mechanism is proceeded through again. It will be appreciated that by changing the number of ratchet teeth on the ratchet wheel between the cutout sections that one or more coin slide reciprocation movements may be provided for depending upon the design of the ratchet wheel. Therefore, the ratchet wheel only needs to be replaced if it is desired to change the number of coin slide reciprocation movements and there is no need to completely replace the coin-receiving mechanism.

As will be evident from the foregoing description, certain aspects of the invention are not limited to the particular details of construction of the examples illustrated, and it is contemplated that other modifications, applications or variations will occur to those skilled in the art. It is therefore intended to cover such modifications, applications and variations as do not depart from the true spirit and scope of the invention.

What is claimed is:

1. An accumulating control clutch mechanism for a timer mechanism with a setting shaft, said clutch mechanism being responsive to multiple reciprocation movements of a coin slide of a coin-receiving mechanism, wherein the control clutch rotates the setting shaft of said timer mechanism unidirectionally in response to a preselected reciprocation movement of the slide comprising:

a. a unidirectional coupling means associated with the slide for reciprocation movement therewith;

b. timer shaft rotating means for setting the timer into operation including in cooperative associated arrangement with each other;

1. a setting hub having at least one tooth and keyed to the timer setting shaft for rotational movement therewith;
2. an actuator arm adapted for oscillatory reciprocation movement about and relative to the setting hub,
3. a ratchet wheel with at least one tooth, said ratchet wheel surrounding the setting hub and rotatable about and relative to the setting hub in response to oscillatory reciprocation movement of the actuated arm, said wheel having at least one cutout portion therein, and
4. a ratchet pawl secured to and movable with the actuator arm, said pawl being biased toward the ratchet wheel and adapted to engage the ratchet wheel tooth and turn the wheel with reciprocation movement of the actuator arm and at a preselected reciprocation movement pass through the cutout portion, engage a tooth of the setting hub and rotate the setting hub with reciprocation movement of the actuator arm thereby rotating the timer setting shaft.

2. The accumulating control clutch mechanism of claim 1 wherein the actuator arm is reciprocally moved upon the outward reciprocation movement of the slide carrying the unidirectional coupling means.

3. The accumulating control clutch mechanism of claim 1 wherein the unidirectional coupling means is a pivotal element that pivots about an offcenter pivot pin with a positive stop element provided to restrict movement of the pivotal element in one direction.

4. The accumulating control clutch mechanism of claim 3 wherein the pivotal element movement is restricted during the outward movement of the coin slide.

5. The accumulating control clutch mechanism of claim 1 wherein the actuator arm is spring biased in one direction with a positive stop provided when the actuator arm is in the vertical position.

6. The accumulating control clutch mechanism of claim 1 wherein the ratchet pawl is spring biased in the direction of the ratchet wheel.

7. The accumulating control clutch mechanism of claim 1 wherein there are at least two cutout sections on the ratchet wheel and the number of teeth on the ratchet wheel between the cutout sections corresponds to the number of coin slide reciprocation movements desired prior to the preselected reciprocation movement that rotates the setting hub.

* * * * *